United States Patent
Poiesz et al.

(10) Patent No.: US 9,830,480 B2
(45) Date of Patent: Nov. 28, 2017

(54) POLICIES FOR SECRETS IN TRUSTED EXECUTION ENVIRONMENTS

(71) Applicant: Google Inc., Mountain View, CA (US)

(72) Inventors: Benjamin David Poiesz, Santa Clara, CA (US); Andrew Abramson, Sunnyvale, CA (US); Neel Rao, San Francisco, CA (US); Shawn Edward Willden, Morgan, UT (US); Andres Guillermo Morales, San Francisco, CA (US); James Brooks Miller, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 192 days.

(21) Appl. No.: 14/832,446

(22) Filed: Aug. 21, 2015

(65) Prior Publication Data
US 2016/0350561 A1 Dec. 1, 2016

Related U.S. Application Data

(60) Provisional application No. 62/167,099, filed on May 27, 2015.

(51) Int. Cl.
*G06F 11/30* (2006.01)
*G06F 12/14* (2006.01)
(Continued)

(52) U.S. Cl.
CPC .............. *G06F 21/72* (2013.01); *G06F 21/53* (2013.01); *G06F 21/629* (2013.01); *G06F 21/74* (2013.01);
(Continued)

(58) Field of Classification Search
CPC ........ G06F 21/53; G06F 21/72; G06F 21/629; G06F 21/74; G06F 2221/034; G06F 2221/2141; H04L 9/3247
(Continued)

(56) References Cited

U.S. PATENT DOCUMENTS

| 8,656,465 B1 | 2/2014 | Fong-Jones |
| 2007/0011736 A1 | 1/2007 | Kalibjian et al. |

(Continued)

FOREIGN PATENT DOCUMENTS

| WO | 03079165 A2 | 9/2003 |

OTHER PUBLICATIONS

International Search Report and Written Opinion of International Application No. PCT/US2016/026191, dated Jul. 14, 2016, 11 pp.
(Continued)

*Primary Examiner* — Dant Shaifer Harriman
(74) *Attorney, Agent, or Firm* — Shumaker & Sieffert, P.A.

(57) ABSTRACT

A computing device executes one or more trusted execution environment (TEE) processes in a TEE of a processor. The one or more TEE processes cryptographically protect a secret and a policy. The policy specifies a plurality of conditions on usage of the secret. A particular non-TEE process generates a request whose fulfillment involves an action requiring use of the secret. Responsive to the request, one or more non-TEE processes determine whether a first subset of the plurality of conditions is satisfied. Responsive to the first subset of the plurality of conditions being satisfied, the one or more TEE processes determine that a second, different subset of the plurality of conditions is satisfied. Responsive to determining the second subset of the plurality of conditions is satisfied, the one or more TEE processes use the secret to perform the action.

20 Claims, 6 Drawing Sheets

(51) Int. Cl.

| | | |
|---|---|---|
| *G06F 21/72* | (2013.01) | |
| *G06F 21/53* | (2013.01) | |
| *H04L 9/32* | (2006.01) | |
| *H04L 9/08* | (2006.01) | |
| *G06F 21/62* | (2013.01) | |
| *G06F 21/74* | (2013.01) | |

(52) U.S. Cl.
CPC ............ *H04L 9/088* (2013.01); *H04L 9/3247* (2013.01); *G06F 2221/034* (2013.01); *G06F 2221/2141* (2013.01)

(58) Field of Classification Search
USPC .......................................................... 713/189
See application file for complete search history.

(56) References Cited

U.S. PATENT DOCUMENTS

| | | |
|---|---|---|
| 2012/0297200 A1 | 11/2012 | Thom et al. |
| 2012/0297455 A1 | 11/2012 | Novak et al. |
| 2013/0290709 A1 | 10/2013 | Muppidi et al. |

OTHER PUBLICATIONS

ARM, "TrustZone," ARM—The Architecture for the Digital World, 2014, Retrieved from <http://www.arm.com/products/processors/technologies/trustzone/index.php> on May 27, 2015, 5 pp.

POLICIES FOR SECRETS IN TRUSTED EXECUTION ENVIRONMENTS

This application claims the benefit of U.S. Provisional Patent Application 62/167,099, filed May 27, 2015, the entire content of which is incorporated herein by reference.

BACKGROUND

Mobile devices are increasingly being used to interact with other connected devices to solve real world problems. For example, there are many new applications and services that simplify home automation tasks, such as network-enabled enabled door locks and lamps. These applications and services may rely on technologies like BLUETOOTH™, near field communication (NFC), audio, or other technologies in order to determine presence in order to provide value and hopefully a secure experience. As a result of these technologies and others, a mobile device's proximity and interactions with other devices should be secure. As an example, if someone steals a mobile device and a home or workplace door can be unlocked with the mobile device, the thief can now access the home or workplace. Other types of security problems involving mobile devices may include access to financial services or access to confidential information.

SUMMARY

One or more processors execute one or more trusted execution environment (TEE) processes in a TEE. Additionally, the one or more processors may execute one or more non-TEE processes outside the TEE. The one or more TEE processes cryptographically protect a secret, such as an encryption key. The one or more TEE processes also cryptographically protect a policy regarding usage of the secret. A non-TEE process may determine whether a first subset of conditions specified by the policy is satisfied. If the first subset of the plurality of conditions is satisfied, a TEE process may determine whether a second, different subset of conditions specified by the policy is satisfied. In some examples, the first and second subsets may at least partially overlap, such that one or more conditions are included in both the first and second subsets. If the TEE process determines that the second subset of the plurality of conditions is satisfied, a TEE process may use the secret. Otherwise, the TEE processes may refrain from using the secret.

In one example, this disclosure describes a method comprising: executing, by one or more processors, in a TEE of the one or more processors, one or more TEE processes; cryptographically protecting, by the one or more TEE processes, a secret; cryptographically protecting, by the one or more TEE processes, a policy such that modifications to the policy are detectable, the policy specifying a plurality of conditions on usage of the secret; executing, by the one or more processors, outside the TEE, one or more non-TEE processes; generating, by the one or more non-TEE processes, a request to perform an action requiring use of the secret; and responsive to the request: determining, by the one or more non-TEE processes, that a first subset of the plurality of conditions is satisfied; responsive to the first subset of the plurality of conditions being satisfied, determining, by the one or more TEE processes, that a second, different subset of the plurality of conditions is satisfied; and responsive to the second subset of the plurality of conditions being satisfied, using, by the one or more TEE processes, the secret to perform the action.

In another example, this disclosure describes a computing device comprising one or more processors configured to provide: a TEE that executes one or more TEE processes, wherein the one or more TEE processes are configured to: cryptographically protect a secret to prevent use of the secret except by the one or more TEE processes; and cryptographically protect a policy such that modifications to the policy are detectable, the policy specifying a plurality of conditions on usage of the secret; and a general execution environment that executes one or more non-TEE processes, wherein a hardware architecture of the computing device isolates processes executed in the TEE from processes operating in the general execution environment, wherein: a particular non-TEE process of the one or more non-TEE processes is configured to generate a request whose fulfillment involves an action requiring use of the secret, the one or more non-TEE processes are configured such that, responsive to the request, the one or more processes determine that a first subset of the plurality of conditions is satisfied, the one or more TEE processes are configured such that, responsive to the first subset of the plurality of conditions being satisfied, the one or more TEE processes determine that a second, different subset of the plurality of conditions is satisfied, and the one or more TEE processes are configured such that, responsive to the second subset of the plurality of conditions being satisfied, the one or more TEE processes use the secret to perform the action.

In another example, this disclosure describes a non-transitory computer-readable data storage medium comprising instructions stored thereon that, when executed by one or more processors, cause the one or more processors to: execute, in a TEE of a particular processor of the one or more processors, one or more TEE processes, wherein the one or more TEE processes are configured to: cryptographically protect a secret to prevent use of the secret except by the one or more TEE processes; and cryptographically protect a policy such that modifications to the policy are detectable, the policy specifying a plurality of conditions on usage of the secret; and execute, in the one or more processors, one or more non-TEE processes, wherein a hardware architecture of the particular processor isolates processes executed by the particular processor in the TEE from processes operating outside the TEE, wherein: a particular non-TEE process of the one or more non-TEE processes is configured to generate a request whose fulfillment involves an action requiring use of the secret, the one or more non-TEE processes are configured such that, responsive to the request, the one or more processes determine that a first subset of the plurality of conditions is satisfied, the one or more TEE processes are configured such that, responsive to the first subset of the plurality of conditions being satisfied, the one or more TEE processes determine that a second, different subset of the plurality of conditions is satisfied, and the one or more TEE processes are configured such that, responsive to the second subset of the plurality of conditions being satisfied, the one or more TEE processes use the secret to perform the action.

The details of one or more examples are set forth in the accompanying drawings and the description below. Other features, objects, and advantages of the disclosure will be apparent from the description, drawings, and claims.

DETAILED DESCRIPTION

Figure 1:
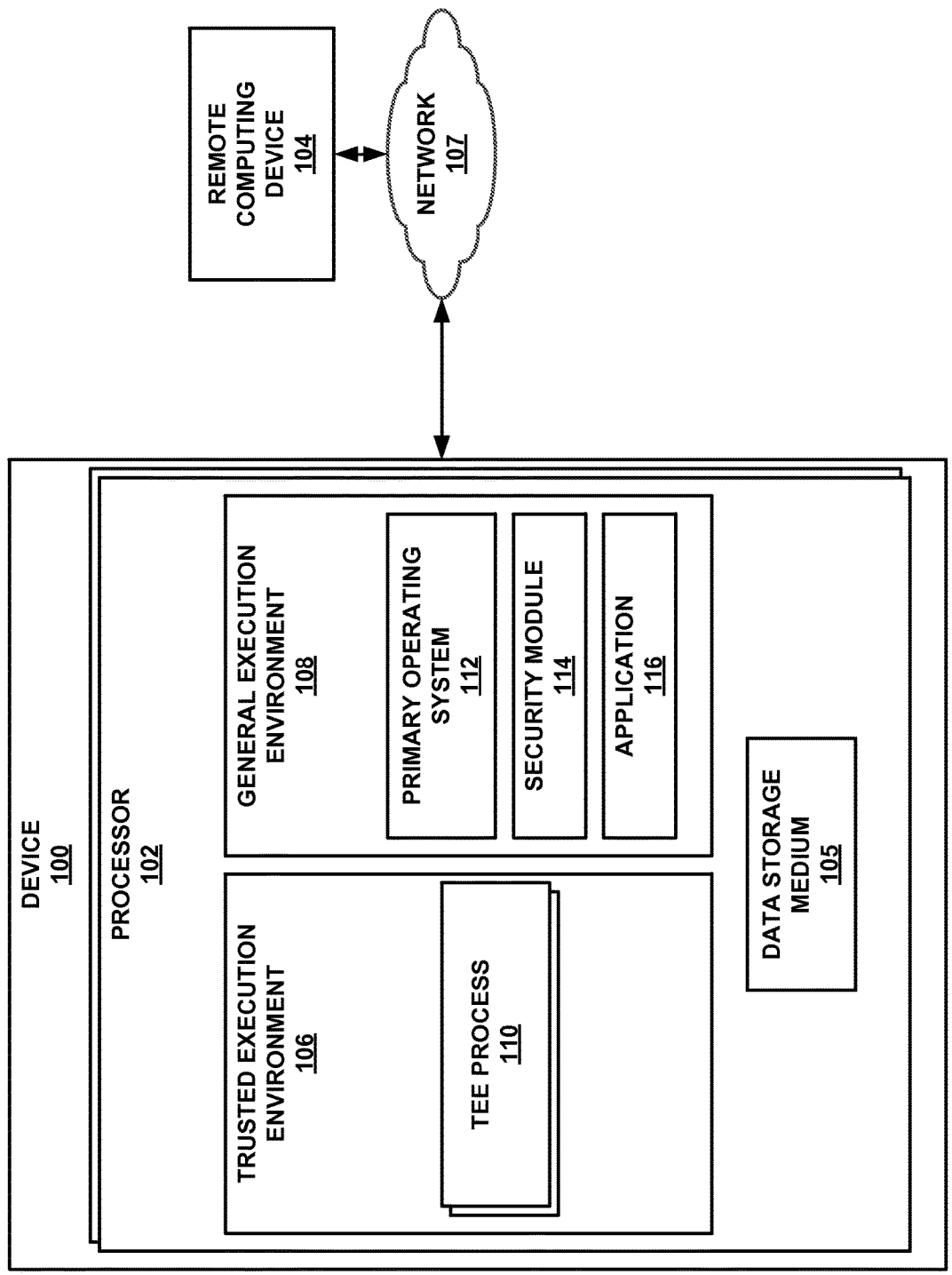
FIG. 1 is a conceptual diagram illustrating an example computing environment, in accordance with a technique of this disclosure.

In general, this disclosure relates to techniques that potentially increase the security of computing devices. In accordance with a technique of this disclosure, a device comprises a processor configured to execute one or more processes in a trusted execution environment (TEE) of the processor. For ease of explanation, this disclosure may refer to processes executing in the TEE as "TEE processes." The processor may also execute processes outside the TEE. For ease of explanation, this disclosure may refer to processes executing outside the TEE as "non-TEE processes." The hardware architecture of the processor isolates processes executed by the processor in the TEE from processes operating in an operating system executing on the processor outside the TEE.

Furthermore, one or more of the TEE processes may cryptographically protect data, which may be referred to herein as a "secret." For instance, the one or more TEE processes may cryptographically protect the secret to prevent use of the secret except by the one or more TEE processes. In some examples, the secret is an encryption key. Additionally, one or more of the TEE processes may cryptographically protect a policy. For instance, the one or more TEE processes may cryptographically protect the policy such that modifications to the policy are detectable. The policy specifies a plurality of conditions on usage of the secret. This disclosure may refer to conditions on usage of the secret as usage conditions.

When a non-TEE process generates a request whose fulfillment involves an action requiring use of the secret, the one or more non-TEE processes may determine whether a first subset of the plurality of usage conditions is satisfied. When the first subset of the plurality of usage conditions is satisfied, one or more of the TEE processes may determine that a second, different subset of the plurality of usage conditions is satisfied. When the second subset of the plurality of usage conditions is satisfied, the one or more TEE processes may use the secret to perform the action.

Thus, in accordance with one or more techniques of this disclosure, some usage conditions of the policy may be evaluated outside the TEE and some usage conditions of the policy may be evaluated inside the TEE. The fact that some usage conditions may be evaluated outside the TEE and some usage conditions may be evaluated within the TEE may enable the policy to include a wider variety of usage conditions. While a level of assurance provided by usage conditions evaluated by non-TEE processes may be less than a level of assurance provided by usage conditions evaluated by TEE processes, usage conditions evaluated by non-TEE processes may rely on data that the TEE processes cannot necessarily trust. For example, a usage condition may involve a check on an expiration date of a secret. In this example, TEE processes may have access to trusted timers the TEE processes use to measure elapsed intervals. However, in this example, the TEE does not have access to a trusted absolute time and date. In this example, non-TEE processes may access the absolute date and time, but also without strong assurance, and the absolute date and time may be untrustworthy even if the absolute date and time did have strong assurance. Another example involves verifying that a given secret can only be used when requested by a specific non-TEE application. In this example, because non-TEE application identity may be a purely non-TEE concept, the TEE can neither distinguish between non-TEE applications nor reliably identify the source of a request.

FIG. 1 is a conceptual diagram illustrating an example computing environment, in accordance with a technique of this disclosure. The computing environment of FIG. 1 includes a device 100, a remote computing device 104, and a network 107. Network 107 may facilitate communication between device 100 and remote computing device 104. Other example computing environments may include more or fewer components. For instance, particular techniques of this disclosure may be implemented without network 107 and remote computing device 104.

Device 100 may, in different examples, comprise various types of devices. For example, device 100 may comprise a mobile device. Example types of mobile devices include mobile phones, tablet computers, wearable computing devices, laptop computers, portable media players, portable game consoles, and other types of devices designed for portability. In other examples, device 100 comprises a personal computer, a server computer, an intermediate network device, a home automation device (e.g., a network enabled appliance, door lock, lamp, home security device), network enabled sensor device, and so on.

In the example of FIG. 1, device 100 comprises one or more processors, including a processor 102, and a data storage medium 105. Other example devices may include other components, such as multiple processors, data storage media, busses, interfaces, and so on. In some examples, processor 102 is implemented using one or more microprocessors. Processor 102 is capable of executing processes. In some examples, processor 102 comprises a multi-core processor. In other examples, processor 102 is a single core (e.g., of a single core or multi-core processor).

Processor 102 implements a trusted execution environment (TEE) 106 and a general execution environment 108. Although the example of FIG. 1 shows general execution environment 108 as existing within processor 102, one or more other processors of device 100 may provide general execution environment 108 or processor 102 may provide general execution environment 108 in combination with one or more other processors of device 100. The hardware architecture of the processor isolates processes executed by the processor in the TEE from processes operating in an operating system executing on the processor outside the TEE. One or more TEE processes 110 may execute in TEE 106 of processor 102. In some examples, TEE processes 110 may be or comprise threads. TEE processes 110 may include one or more processes that provide a specialized TEE operating system that manages operations of other ones of TEE processes 110. In some examples, TEE processes 110 and non-TEE processes may execute on the same physical hardware of processor 102. Thus, in such examples, TEE 106 may be characterized as a processing mode of processor 102. In some examples, TEE 106 may be provided by one or more processors of device 100.

Processes executing in TEE 106 (i.e., processes executing in TEE mode) may have access to additional system resources that are unavailable to non-TEE processes (e.g., code executing in non-TEE mode). For example, regions of device memory can be marked as accessible only to TEE 106. This allows TEE processes 110 to have both working memory and persistent storage inaccessible to non-TEE processes. In some examples, TEE processes 110 have access to "secure" modes of system peripherals. For example, a display and touch screen of a mobile device, or even regions thereof, can be placed in a secure mode and while in that mode, non-TEE processes cannot write to the display or receive input from the touch screen. The same concept may apply to many peripherals.

The TEE operating system may have significantly fewer capabilities than a typical operating system, such as an ANDROID, IOS, or WINDOWS operating system. Accordingly, TEE processes whose operations are managed by the TEE operating system may be more constrained in their capabilities than typical processes. TRUSTZONE is an example TEE technology.

Furthermore, TEE processes 110 may be unable to trust (or, in some examples, access) data accessible to non-TEE processes, i.e., processes executing in general execution environment 108. For example, TEE processes 110 may be unable to trust particular types of data originating from non-TEE processes. For instance, TEE processes 110 may be unable to trust global positioning system (GPS) data originating from a non-TEE process. However, TEE processes 110 may trust data originating from TEE processes 110 and particular other trusted data sources, such as a clock of device 100.

Processor 102 may execute a primary operating system 112 in general execution environment 108. In some examples, primary operating system 112 is an ANDROID, IOS, or WINDOWS operating system. Additionally, processors 102 may execute a security module 114 in general execution environment 108. In some examples, security module 114 is part of primary operating system 112. In such examples, the techniques of this disclosure may be implemented at the operating system level so that each application does not need to implement its own solution for controlling using a secret and the solutions are consistent for users. Furthermore, processor 102 may execute an application 116 in general execution environment 108. Primary operating system 112, security module 114, and application 116 may each comprise one or more non-TEE processes. Other processors of device 100 may or may not include a TEE. Moreover, in some examples, the functions of primary operating system 112, security module 114, application 116, and/or other non-TEE processes may be performed on various processors of device 100. For instance, although this disclosure may refer to non-TEE processes executing on processor 102, such non-TEE processes may, in other examples, execute on other processors, e.g., other processors of device 100.

Application 116 may comprise a wide variety of applications. For example, application 116 may comprise a banking application, an application for controlling home automation devices, an application that accesses private data, and so on. In some examples, application 116 may comprise a third-party application, i.e., an application developed by a party other than a user of device 100 or a developer of primary operating system 112. Furthermore, in some examples, device 100 may download application 116 from an application store service.

Security module 114 may enable a limited form of interactions between TEE processes 110 and non-TEE processes. In some examples, security module 114 implements an application programming interface (API) comprising one or more functions. Non-TEE applications, such as application 116, may invoke functions of the API to interact with TEE processes 110.

In accordance with one or more techniques of this disclosure, a non-TEE process may request a TEE process to cryptographically protect a secret to prevent use of the secret except by TEE processes 110. The secret may comprise various types of data. For example, the secret may comprise a symmetric or asymmetric encryption key, a nonce value, initialization vectors, passwords, authentication tokens, authorization tokens and payment tokens, or other types of data.

TEE processes 110 may cryptographically protect the secret in various ways. For example, TEE 106 may have an encryption key accessible only by TEE processes 110. In some instances, this encryption key is factory installed in processor 102. In this example, a TEE process may encrypt the secret using the encryption key. Because the encryption key is only accessible to TEE processes 110, the encryption of the secret may prevent the use of the secret except by TEE processes 110, which can use the encryption key to decode the encrypted secret. In a similar example, TEE 106 may have a private asymmetric encryption key and a public asymmetric encryption key. In this example, the private asymmetric encryption key is only accessible to TEE processes 110. In this example, a TEE process may encrypt the secret using the public asymmetric encryption key. Because the private encryption key is only accessible to TEE processes 110, the encryption of the secret may prevent the use of the secret except by TEE processes 110, which can use the private asymmetric encryption key to decode the encrypted secret. TEE processes 110 may store the encrypted secret in data storage medium 105.

Furthermore, a non-TEE process may request a TEE process to cryptographically protect a policy specifying a plurality of usage conditions on the usage of the secret. For example, application 116, security module 114, primary operating system 112, and/or another non-TEE process may request a TEE process to cryptographically protect a policy specifying a plurality of usage conditions on usage of the secret.

A policy may specify a wide variety of usage conditions. For example, a policy may specify a usage condition based on a time since a last unlock of a device comprising processor 102. In another example, a policy may specify a usage condition based on whether a display screen of the device is on. In another example, a policy may specify a usage condition based on whether the device is unlocked. For instance, the policy may specify that the secret may not be used when the device is in a locked state. In another example, a policy may specify a usage condition based on an idle time of the device. For instance, the policy may specify that the secret may not be used if the amount of time the device has been idle is greater than a particular threshold (e.g., 1 minute). In another example, a policy may specify a usage condition setting a maximum rate of attempts to use the secret. For instance, the policy may specify that the secret cannot be used if there have been more than a given number (e.g., 5) attempts to use the secret in a given time period (e.g., 1 minute).

In another example, a policy may specify a usage condition setting a maximum number of uses of the secret per boot of the device. In another example, a policy may specify a usage condition that only permits a bootloader of the device to use the secret. In another example, a policy may specify a usage condition based on a geographic location of the device. For instance, the policy may specify that the secret may only be used if device 102 is at, within, or outside a particular area. In another example, a policy may specify a usage condition based on the device receiving an indication of biometric data of an authorized user. Example types of biometric data include voice data, retina data, fingerprint data, and so on. In this example, a policy may specify that the secret may only be used if device 102 has received the indication of biometric data (e.g., within a particular length of time, with screen unlock, with initial login, etc.). Different types of conditions may be used to prevent particular attacks or reduce risks associated with particular attacks.

TEE processes 110 may cryptographically protect the policy in various ways. For example, a TEE process may cryptographically protect the policy such that modifications to the policy are detectable. For instance, a TEE process may generate a digital signature for the policy. In some examples, the TEE process generates the digital signature by generating a hash value of data comprising the policy. The TEE process then encrypts the hash value using a private encryption key only accessible to TEE processes 110. A process (e.g., TEE processes 110 or non-TEE processes) may be able to determine whether the policy has been modified by regenerating the hash value based on submitted policy data and decrypting the digital signature using a corresponding public encryption key. If the regenerated hash value and the decrypted digital signature match, the process is able to determine that the submitted policy data has not been modified.

TEE processes 110 or a non-TEE process may store the cryptographically protected policy in data storage medium 105. For instance, in some examples where the secret comprises a key pair (e.g., public and private key) or a symmetric key, storing the policy along with the key in a hardware backed TEE, like TRUSTZONE, may ensure the policy is always correctly interpreted by the operating system. When the policy and key are both protected by TEE 106, this enables operating system 112 to gate operations using the key based upon the conditions defined in the policy. By having trusted code validate the conditions of the policy are met, it may be ensured that logic is not being tampered with and that when TEE 106 allows an operation to be performed with a key, that the conditions associated with that key are met.

A non-TEE process, such as application 116, primary operating system 112, or security module 114, may generate a request whose fulfillment involves an action requiring use of the secret. In some examples, application 116 or primary operating system 112 may generate the request by invoking a function of security module 114.

Responsive to the request, security module 114 may retrieve and validate the integrity of a policy corresponding to the secret. Validating the integrity of a policy may comprise determining that the policy has not been modified in an unauthorized way. Furthermore, security module 114 may determine whether a first subset of the usage conditions of the policy is satisfied. For example, the policy may specify usage conditions A, B, C, and D. In this example, security module 114 may determine whether usage conditions A and B are satisfied, but does not determine whether usage conditions C and D are satisfied. The first subset of the usage conditions may comprise usage conditions whose evaluation relies on data not accessible to and/or trusted by TEE processes 110. The first subset of usage conditions may also comprise usage conditions whose evaluation relies on data accessible to and/or trusted by TEE processes 110.

Responsive to determining that the first subset of the plurality of usage conditions is satisfied, one or more of TEE processes 110 may determine whether a second, different subset of the usage conditions of the policy is satisfied. In some examples, the one or more TEE processes determine whether the second subset of usage conditions is satisfied in response to a request from security module 114. The second subset of the usage conditions may comprise usage conditions whose evaluation only relies on data that is accessible and trusted by TEE processes 110. In some examples, each respective usage condition of the policy is in exactly one of the first subset or the second subset. In some examples, one or more of the usage conditions in the first subset may also be included in the second subset, and vice versa.

Responsive to the one or more TEE processes 110 determining that the second subset of the usage conditions is satisfied, the one or more TEE processes 110 may use the secret to perform an action. For example, one or more of TEE processes 110 may use the secret to encrypt data.

For instance, in this example, remote computing system 104 and application 116 are associated with a user's financial services company. In this example, when a user attempts to access financial information from remote computing device 104 for a first time, remote computing device 104 sends an encryption key and a policy for the encryption key to application 116. In response, application 116 may request security module 114, and hence, one or more of TEE processes 110, to cryptographically protect the encryption key and the policy. During subsequent attempts to access the financial information, remote computing device 104 sends a nonce value to device 100. Furthermore, in this example, application 116 receives the nonce value and requests the nonce value be encrypted using the encryption key. If the usage conditions of the policy are satisfied, one or more of TEE processes 110 encrypt the nonce value using the encryption key. Security module 114 provides the encrypted nonce value to application 116. Application 116 sends the encrypted nonce value to remote computing device 104. Remote computing device 104 verifies that the received nonce value matches the sent nonce value. If so, remote computing device 104 may provide the financial information to application 116.

Thus, in accordance with some techniques of this disclosure, processor 102 may execute, in TEE 106, one or more TEE processes 110. The one or more TEE processes 110 may cryptographically protect a secret to prevent use of the secret except by the one or more TEE processes. Additionally, the one or more TEE processes 110 may cryptographically protect a policy such that modifications to the policy are detectable, the policy specifying a plurality of conditions on usage of the secret. Furthermore, processor 102, and/or one or more other processors, may execute, outside TEE 106 of processor 102, one or more non-TEE processes. The one or more non-TEE processes include a particular non-TEE process. The particular non-TEE process may generate a request whose fulfillment involves an action requiring use of the secret. Responsive to the request, the one or more non-TEE processes may determine that a first subset of the plurality of conditions is satisfied. Responsive to the first subset of the plurality of conditions being satisfied, the one or more TEE processes may determine that a second, different subset of the plurality of conditions is satisfied.

Responsive to the second subset of the plurality of conditions being satisfied, the one or more TEE processes may use the secret to perform the action.

Responsive to determining the first subset of the plurality of the conditions is not satisfied, processor 102 refrains from performing the action. Similarly, responsive to determining the first subset of the conditions is satisfied, but the second plurality of the conditions is not satisfied, processor 102 refrains from performing the action.

In some examples, a policy for a secret may specify one or more invalidation conditions. The invalidation conditions may be in addition to conditions specified by the policy for use of the secret. In some examples, a developer of application 116 determines the invalidation conditions. When one or more invalidation conditions are satisfied, processor 102 invalidates the secret such that the secret cannot be used. For example, an invalidation condition of a policy for a secret may specify that changing a device unlock password or turning off device lock invalidates the secret. In some examples, a non-TEE process, such as security module 114 or application 116, determines whether one or more of the invalidation conditions are satisfied. Furthermore, in some examples, the secret is invalidated if the integrity of the policy has been compromised. For instance, if one or more of TEE processes 110 or a non-TEE process determines that an attempt has been made to modify the policy associated with a secret in an unauthorized way, the TEE process or non-TEE process may invalidate the secret. In some examples, one or more of TEE processes 110 determine whether one or more of the invalidation conditions are satisfied. Thus, based on the policy, one or more of TEE processes 110 may invalidate the secret. In some examples, an application, such as application 116, associated with a secret is notified if the secret is invalidated.

Figure 2:
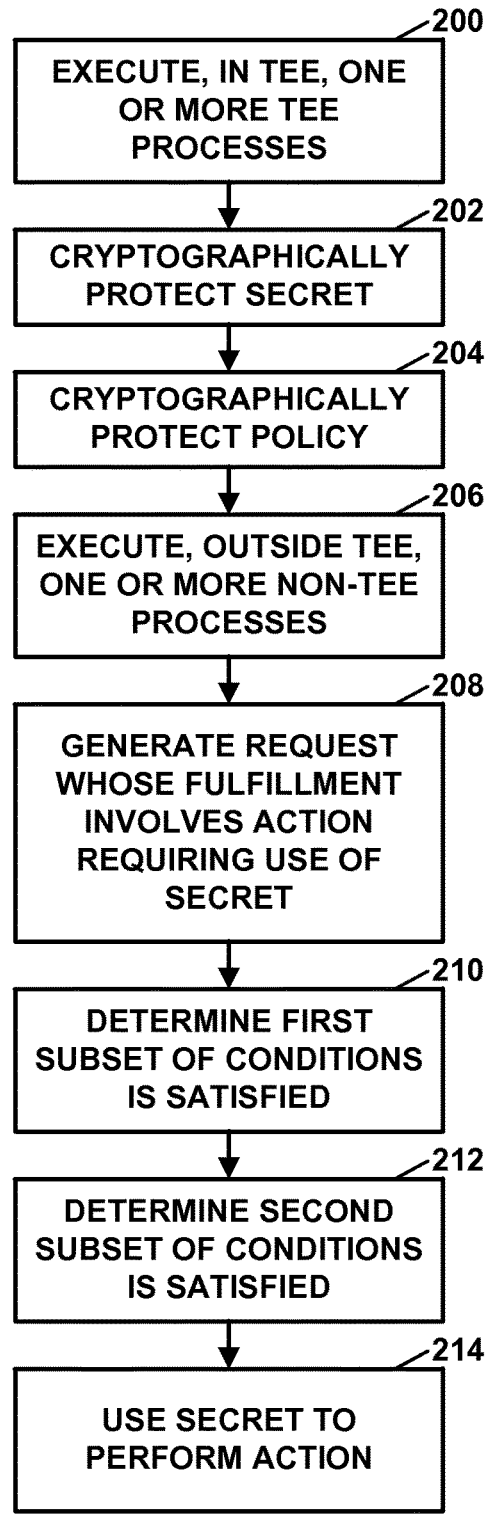
FIG. 2 is a flowchart illustrating an example operation of a device, in accordance with a technique of this disclosure.

FIG. 2 is a flowchart illustrating an example operation of a device, in accordance with a technique of this disclosure. The flowcharts of this disclosure are provided as examples. Other examples in accordance with the techniques of this disclosure may include more, fewer, or different actions. Moreover, other examples in accordance with the techniques of this disclosure may perform the actions in different orders and/or may perform particular actions in parallel.

In the example of FIG. 2, one or more processors (e.g., processor 102) may execute, in a TEE of the one or more processors, one or more TEE processes (200). The one or more TEE processes may cryptographically protect a secret (202). For instance, the one or more TEE processes may cryptographically protect the secret to prevent use of the secret except by the one or more TEE processes (202). Additionally, the one or more TEE processes 110 may cryptographically protect a policy such that modifications to the policy are detectable (204). In the example of FIG. 2, the policy specifies a plurality of conditions on usage of the secret.

In some examples, the policy may comprise a plurality of condition-action pairs. In some examples, each condition of a condition-action pair comprises one or more Boolean statements (i.e., statements evaluating to true or false). In examples where a condition comprises a plurality of Boolean statements, the Boolean statements may be connected using various operators, such as "and", "or", "exclusive or", and so on. Furthermore, the "not" operator may be applied to Boolean statements. An action of a condition-action pair may specify an action to perform in response to the condition being satisfied. For example, an action may indicate that use of a secret is allowed or denied. Furthermore, in some examples an action may indicate that the secret is invalidated. In some examples, a process may implement a forward-chaining rules engine to evaluate the conditions of the condition action pairs.

In some examples, a policy specifies one or more rules controlling updates to the policy. For instance, a policy may specify that no updates to the policy are permitted. In other examples, a policy may specify conditions on which the policy may be updated. For example, a policy may specify that the policy may be updated at particular times or by particular users. Furthermore, in some examples, a policy may specify that some conditions of the policy may be updated while other conditions of the policy cannot be updated. In some examples, when a TEE process updates a policy, the TEE process cryptographically protects the updated policy. For instance, the TEE process may generate a new digital signature for the updated policy. If the policy has been updated in a manner permitted by the policy, the change to the policy may be considered to be authorized. Otherwise, the change may be considered to be unauthorized.

Furthermore, one or more processors, such as processor 102, may execute, outside TEE 106 of processor 102, one or more non-TEE processes (206). The one or more non-TEE processes may generate a request to perform (or whose fulfillment involves) an action requiring use of the secret (208). Responsive to the request, the one or more non-TEE processes may determine that a first subset of the plurality of conditions is satisfied (210). Responsive to the first subset of the plurality of conditions being satisfied, the one or more TEE processes may determine that a second, different subset of the plurality of conditions of the policy is satisfied (212). Responsive to the second subset of the plurality of conditions being satisfied, the one or more TEE processes may use the secret to perform the action (214).

Figure 3:
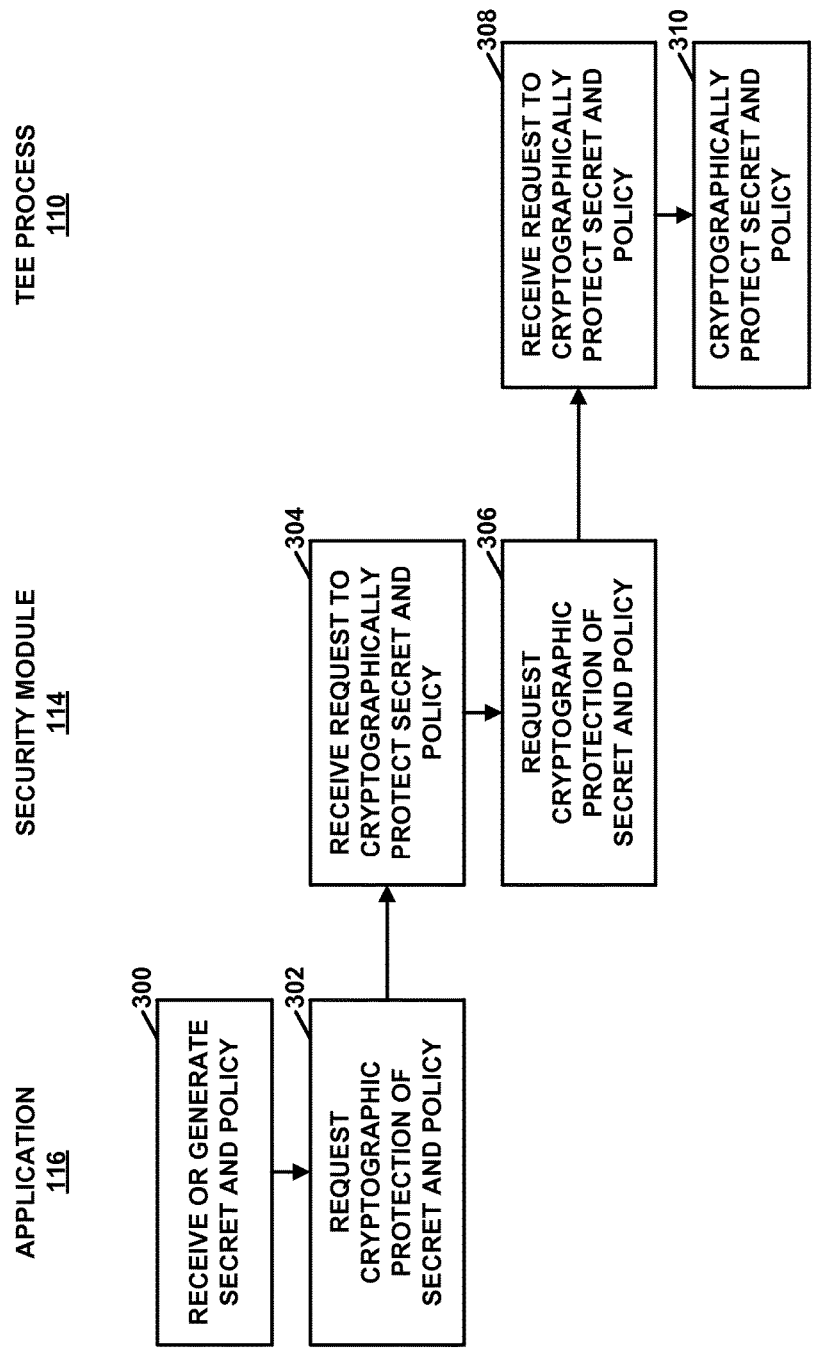
FIG. 3 is a flowchart illustrating an example interaction between an application, a security module, and a trusted execution environment (TEE) process, in accordance with a technique of this disclosure.

FIG. 3 is a flowchart illustrating an example interaction between application 116, security module 114, and a TEE process, in accordance with a technique of this disclosure. The TEE process may be one of TEE processes 110. The example interaction shown in FIG. 3, FIG. 4, FIG. 5, and FIG. 6 includes particular actions included in the example of FIG. 2.

In the example of FIG. 3, application 116 receives or generates a secret and a policy for the secret (300). For example, application 116 may receive the secret and/or policy from a remote computing device, such as remote computing device 104 of FIG. 1. In another example, application 116 may generate the secret and/or the policy locally at device 100. Additionally, in the example of FIG. 3, application 116 generates one or more requests for cryptographic protection of the secret and policy (302). For instance, application 116 may invoke one or more functions of an API to request cryptographic protection of the secret and policy.

Because the secret and policy may originate outside TEE 104, application developers may have wide flexibility in selecting the secret and policy. For example, application 116 may be a door-unlock application. In this example, application 116 may be configured to only allow a door to be unlocked if device 100 has been used with the lockscreen unlocked within the past 30 minutes. Furthermore, in this example, if the phone has not been unlocked in the past 30 minutes, application 116 may ask operating system 112 to prompt the user with a "re-challenge" to unlock or present the user's fingerprint. This example may be further tied into biometrics like fingerprint or other signals.

Security module 114 receives one or more requests to cryptographically protect the secret and policy (304). In response, security module 114 generates one or more requests for the TEE process to cryptographically protect the secret and policy (306). The TEE process receives the one or more requests to cryptographically protect the secret and policy (308). In response, the TEE process cryptographically protects the secret and policy (310). For example, the TEE process may receive the secret from a particular non-TEE process and, responsive to the TEE process receiving the secret from the particular non-TEE process, cryptographically protect the secret to prevent use of the secret except by processes executed in the TEE of the processor. In this example, responsive to the particular TEE process receiving the policy from the particular non-TEE process, the TEE process may cryptographically protect the policy such that modifications to the policy are detectable. For instance, in some examples, one or more TEE processes 110 may use a private key to generate a digital signature for the policy. In such examples, the private key is not accessible except to processes executing in the TEE of processor 102.

In some examples, when the one or more TEE processes cryptographically protect the secret and policy, the one or more TEE processes return a blob (e.g., a set of binary data) comprising the cryptographically protected secret and policy. Security module 114 may provide the blob to application 116. Application 116 may store the blob, e.g., in data storage medium 105, for later use.

Figure 4:
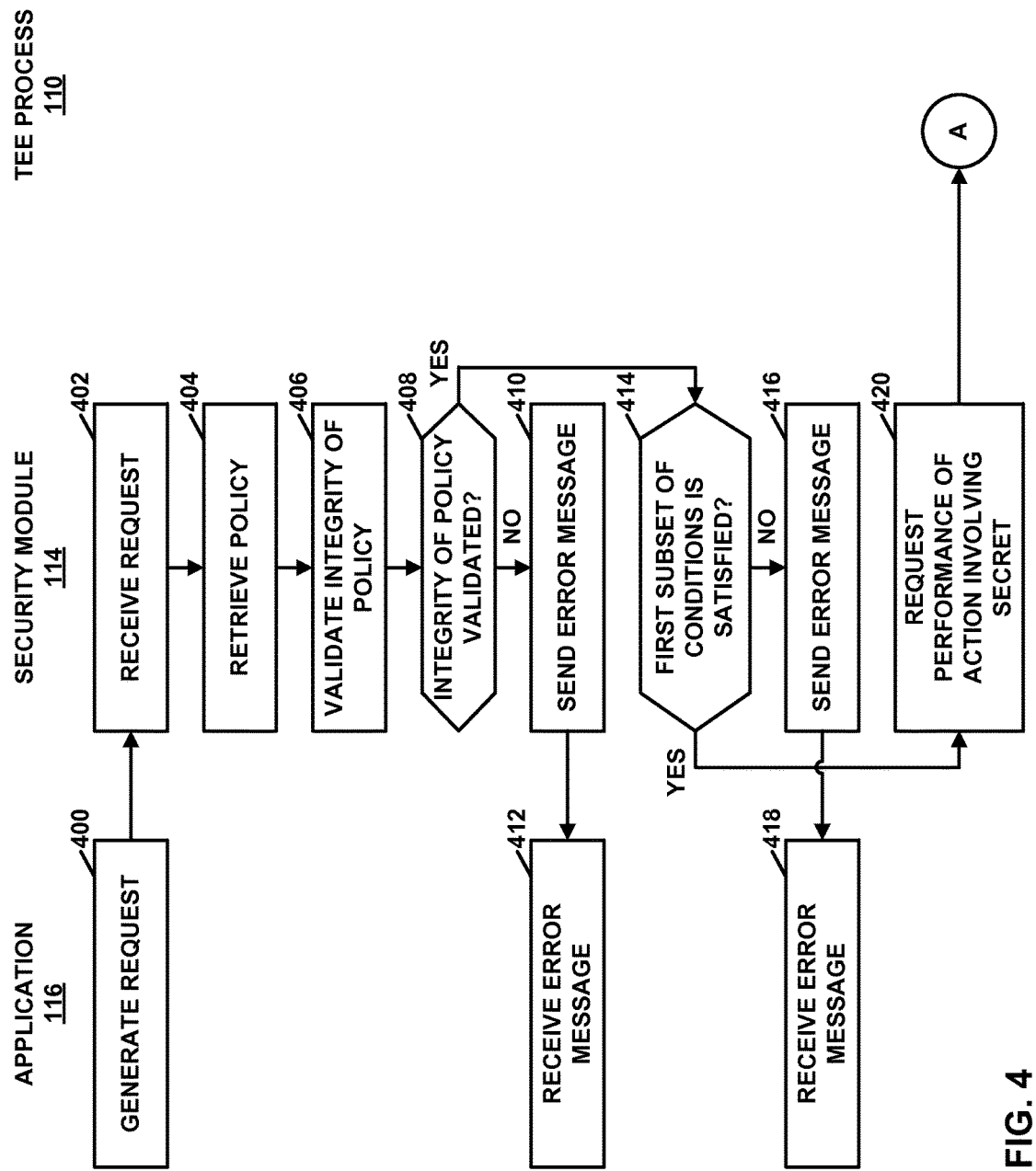
FIG. 4 is a flowchart illustrating a continuation of the example interaction of FIG. 3, in accordance with a technique of this disclosure.

FIG. 4 is a flowchart illustrating a continuation of the example interaction of FIG. 3, in accordance with a technique of this disclosure. In the example of FIG. 4, application 116 generates a request whose fulfillment requires use of the secret (400). Security module 114 receives the request (402). In response, security module 114 retrieves the policy for the secret (404). In some examples, security module 114 may obtain the policy from one of TEE processes 110. Thus, in one example where security module 114 comprises an API process, the API process may receive a first request (e.g., in action 402) and, responsive to the first request, generate a second request. Furthermore, in this example, responsive to the second request, the one or more TEE processes may provide the policy to the API process. In some such examples, cryptographically protecting the policy comprises encrypting the policy. Accordingly, in such examples, as part of retrieving the policy, security module 114 may request a TEE process provide the decrypted policy to security module 114.

Furthermore, in some examples, security module 114 may receive, from application 116, a blob comprising the cryptographically protected secret and policy. In such examples, because the policy is not encrypted, security module 114 may access the conditions of policy, but may not be able to decode the encrypted secret.

Security module 114 may validate the integrity of the policy (406). For example, security module 114 may check a digital signature of the policy to ensure that the policy has not been modified. Hence, in examples where security module 114 comprises an API process, the API process, responsive to receiving the policy, may validate that no unauthorized modifications to the policy have occurred. Responsive to determining that the integrity of the policy is not successfully validated ("NO" branch of 408), security module 402 may send an error message to application 116 (410). Application 116 may then receive the error message (412).

On the other hand, responsive to determining that the integrity of the policy is successfully validated ("YES" branch of 408), security module 114 may determine whether a first subset of usage conditions specified by the policy is satisfied (414). In some examples, two or more usage conditions specified by a policy have an "or" relationship with each other. For instance, the first subset of the usage conditions may be a series of a Boolean statements (e.g., usage conditions) joined by Boolean operators. Hence, in some such examples, a subset of usage conditions may be considered satisfied if any one of the two or more usage conditions are satisfied. For instance, in one example, a subset of the usage conditions may specify that the secret can be used if the current time is between 8:00 am and 5:00 pm or device 100 is at a particular location. Thus, in this example, the subset of the usage conditions may be satisfied if either the current time is between 8:00 am and 5:00 pm or device 100 is at a particular location.

Responsive to determining that the first subset of usage conditions is not satisfied ("NO" branch of 414), security module 114 sends an error message to application 116 (416). Application 116 receives the error message (418). Application 116 may perform various actions in response to receiving the error message. For example, application 116 may cause processor 104 to output, for display, a message indicating to a user which usage condition of the policy was not satisfied. On the other hand, responsive to determining that the first subset of usage conditions is satisfied ("YES" branch of 414), security module 114 requests performance of an action involving use of the secret (420). Subsequent portions of the example interaction of FIG. 4 are shown in FIG. 5 and marked "A."

A non-TEE process may communicate with a TEE process in various ways. For example, assuming the TEE is a special mode of the main processor, one mechanism is to write the request data into a specific region of memory, then invoke a "secure mode switch" instruction that places the processor in secure mode. In this example, the TEE operating system then retrieves the request from the memory region, performs responsive computations, and writes a result into a specific memory region. In this example, the processor then switches back to non-secure mode. This example may involve the non-TEE OS pre-empting the TEE OS. At a higher level, this memory-based message passing and mode switching is generally implemented in the non-TEE OS as a device driver, and non-TEE processes communicate by invoking a non-TEE OS API which triggers the driver. In the case of the ANDROID operating system, a Linux character device node, which looks at processes like a special kind of file, is used. Non-TEE processes write to and read from the "file" and the device driver takes care of doing the message passing and mode switching. The above examples apply to TEEs on the same processor (e.g., CPU) as the non-TEE processes. In the examples where a TEE is implemented on a separate processor from a processor executing the non-TEE processes, a communication path may comprise data encoded on a serial communication link or parallel data bus.

Although the example of FIG. 4 shows security module 114 determining whether the first subset of usage conditions is satisfied, in other examples, other TEE processes may determine whether the first subset of the usage conditions is satisfied. For instance, application 116 itself may determine whether the first subset of the usage conditions is satisfied.

Figure 5:
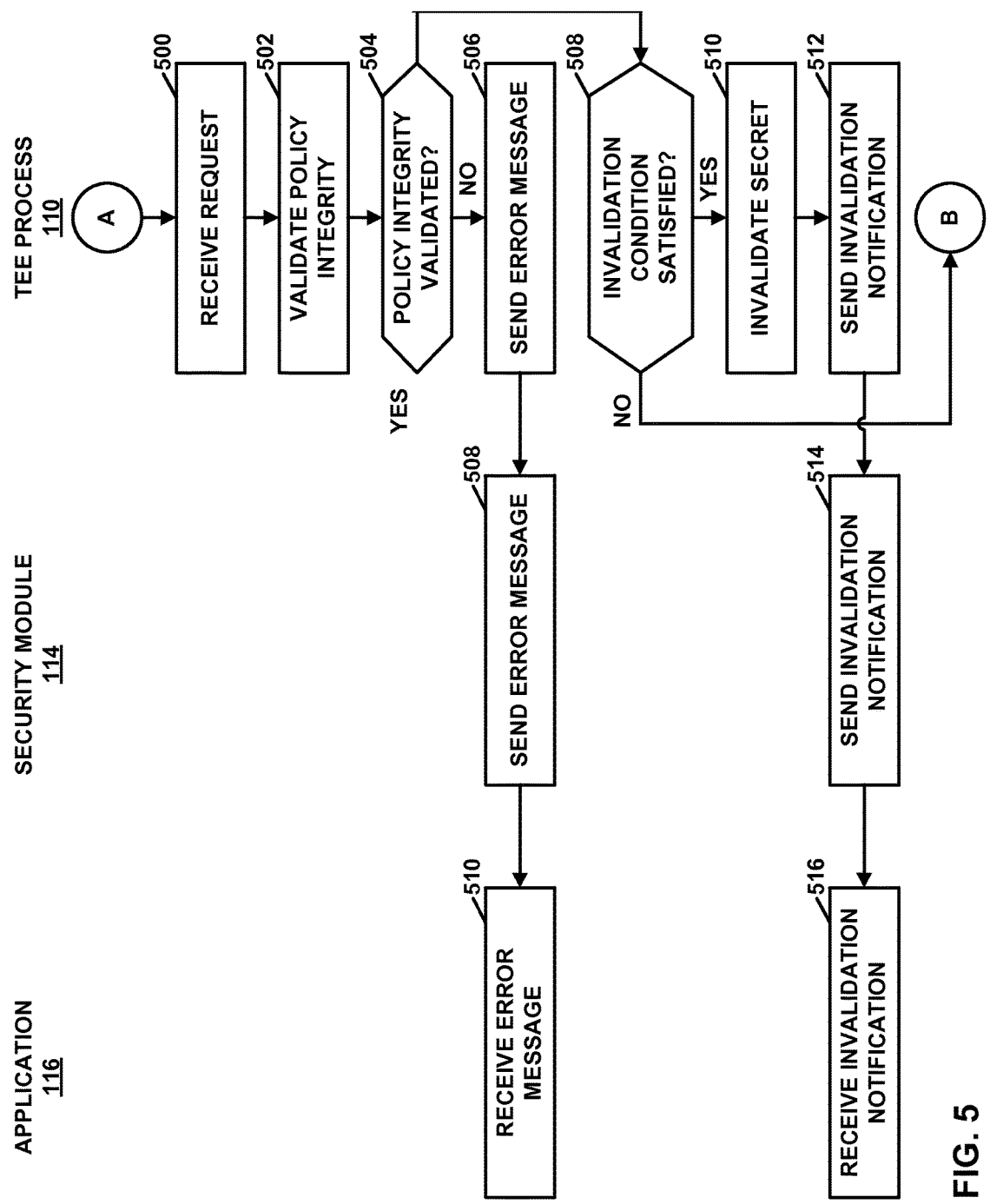
FIG. 5 is a flowchart illustrating a continuation of the example interaction of FIG. 3 and FIG. 4, in accordance with a technique of this disclosure.

FIG. 5 is a flowchart illustrating a continuation of the example interaction of FIG. 3 and FIG. 4, in accordance with a technique of this disclosure. In the example of FIG. 5, the TEE process receives the request to perform the action involving use of the secret (500). In some examples, the request comprises a blob comprising the cryptographically protected secret and policy. Responsive to receiving the request, the TEE process validates the integrity of the policy for the secret (502). In other words, responsive to the first subset of the plurality of conditions being satisfied, the TEE process validates that no unauthorized modifications to the policy have occurred. Responsive to determining that the integrity of the policy is not successfully validated ("NO" branch of 504), the TEE process sends an error message to security module 114 (506). Security module 114 then sends an error message to application 116 (508). Application 116 receives the error message (510).

On the other hand, responsive to determining that the integrity of the policy is successfully validated ("YES" branch of 504), the TEE process may determine whether an invalidation condition of the policy is satisfied (508). Responsive to determining that the invalidation condition is not satisfied ("NO" branch of 508), the portion of the interaction shown in FIG. 6 and marked as "B" may be performed. However, responsive to determining the invalidation condition of the policy is satisfied ("YES" branch of 508), the TEE process invalidates the secret (510). The TEE process may invalidate the secret in various ways. For example, the TEE process may simply delete the secret. In another example, the TEE process may store data indicating that the secret is invalid. In this example, the TEE process does not use a secret if the secret is indicated as being invalid.

Additionally, the TEE process may send an invalidation notification to security module 114 (512). The invalidation notification indicates that the secret has been invalidated. Security module 114 may then send an invalidation notification to application 116 (514). Application 116 then receives the invalidation notification (516). Application 116 may perform various actions in response to receiving an invalidation notification. For example, application 116 may cause processor 102 to output, for display, an indication that the secret has been invalidated. In some examples, application 116 may request a new secret from a remote computing device, such as remote computing device 104.

Although not shown in the preceding flowcharts, non-TEE processes, such as security module 114 and application 116, may also determine whether an invalidity condition specified by a policy is satisfied. Furthermore, the non-TEE processes may also invalidate a secret associated with the policy.

Figure 6:
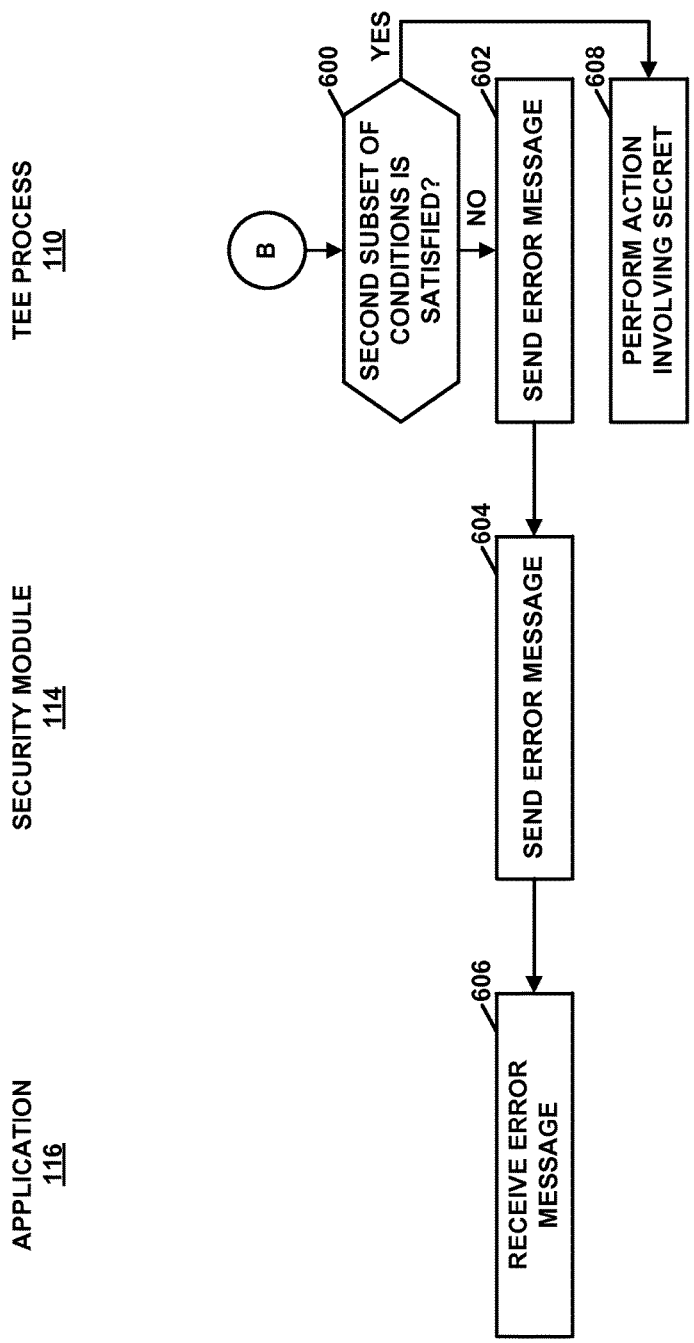
FIG. 6 is a flowchart illustrating a continuation of the example interaction of FIG. 3, FIG. 4, and FIG. 5, in accordance with a technique of this disclosure.

FIG. 6 is a flowchart illustrating a continuation of the example interaction of FIG. 3, FIG. 4, and FIG. 5, in accordance with a technique of this disclosure. The portion of the example interaction shown in FIG. 6 may be performed after the TEE process determines that the invalidation condition is not satisfied. In the example of FIG. 6, the TEE process determines whether a second subset of the usage conditions of the policy is satisfied (600). For instance, the second subset of the usage conditions may be a series of a Boolean statements (e.g., usage conditions) joined by Boolean operators. Thus, the second subset of usage conditions may be satisfied if the whole statement evaluates to true (or false). Responsive to determining that the second subset of usage conditions is not satisfied ("NO" branch of 600), the TEE process sends an error message to security module 114 (602). Security module 114 then sends an error message to application 116 (604). Application 116 receives the error message (606). Application 116 may perform various actions in response to receiving the error message. For example, application 116 may cause processor 104 to output, for display, a message indicating to a user which usage condition of the policy was not satisfied.

However, responsive to determining that the second subset of the usage conditions is satisfied ("YES" branch of 600), the TEE process performs the action involving use of the secret (608). For example, the secret may comprise an encryption key and the request from the application may be to encrypt data using the cryptographic key or to generate a digital signature for the data using the cryptographic key. In this example, using the secret to perform the action may comprise using, by the one or more TEE processes, the cryptographic key to encrypt the data or to generate the digital signature for the data. Furthermore, in this example, device 100 may send the encrypted data or the digital signature to a remote computing device.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or may include communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
executing, by one or more micro-processors, in a trusted execution environment of the one or more micro-processors, one or more trusted execution environment processes;
cryptographically protecting, by the one or more micro-processors, using the one or more trusted execution environment processes, a secret;
cryptographically protecting, by the one or more micro-processors, using the one or more trusted execution environment processes, a policy such that modifications to the policy are detectable, the policy specifying a plurality of conditions on usage of the secret;
executing, by the one or more micro-processors, outside the trusted execution environment, one or more non-trusted execution environment processes;
generating, by the one or more micro-processors, using the one or more non-trusted execution environment processes, a request to perform an action requiring use of the secret; and responsive to the request:
determining, by the one or more micro-processors, using the one or more non-trusted execution environment processes, that a first subset of the plurality of conditions is satisfied;
responsive to the first subset of the plurality of conditions being satisfied, determining, by the one or more micro-processors, using the one or more trusted execution environment processes, that a second, different subset of the plurality of conditions is satisfied; and
responsive to the second subset of the plurality of conditions being satisfied, performing, by the one or more micro-processors, using the one or more trusted execution environment processes and the secret the action.

2. The method of claim 1, wherein:
the request is a first request and the action is a first action, and
the method further comprises:
generating, by the one or more processors, using the one or more non-trusted execution environment processes, a second request whose fulfillment involves a second action requiring use of the secret; and
responsive to the second request:
determining, by the one or more processors, using the one or more non-trusted execution environment processes, that the first subset of the plurality of conditions is not satisfied; and
responsive to the first subset of the plurality conditions not being satisfied, refraining from performing, by the one or more processors, the second action.

3. The method of claim 1, wherein:
the request is a first request and the action is a first action;
the method further comprising:
generating, by the one or more processors, using the one or more non-trusted execution environment processes, a second request whose fulfillment involves a second action requiring use of the secret; and
responsive to the second request,
determining, by the one or more processors, using the one or more non-trusted execution environment processes, that the first subset of the plurality of conditions is satisfied; and
responsive to the first subset of the plurality of conditions being satisfied, determining, by the one or more processors, using the one or more non-trusted execution environment processes, that the second subset of the plurality of conditions is not satisfied; and
responsive to the second subset of the plurality conditions not being satisfied, refraining from performing, by the one or more processors, the second action.

4. The method of claim 1, wherein the plurality of conditions comprises one or more of:
a condition based on a time since a last unlock of a device comprising the one or more processors;
a condition based on whether a display screen of the device is on;
a condition based on whether the device is unlocked;
a condition based on an idle time of the device;
a condition setting a maximum rate of attempts to use the secret;
a condition setting a maximum number of uses of the secret per boot of the device;
a condition that only permits a bootloader of the device to use the secret;
a condition based on a geographic location of the device; and
a condition based on the device receiving an indication of biometric data of an authorized user.

5. The method of claim 1, wherein cryptographically protecting the policy comprises:
using, by the one or more processors, using the one or more trusted execution environment processes, a private key to generate a digital signature for the policy, wherein the private key is not accessible except to processes executing in the trusted execution environment of the one or more processors.

6. The method of claim 1, further comprising:
responsive to the first subset of the plurality of conditions being satisfied, validating, by the one or more processors, using the one or more trusted execution environment processes, that no unauthorized modifications to the policy have occurred.

7. The method of claim 1, wherein:
the method further comprises, receiving, by the one or more processors, using a particular trusted execution environment process of the one or more trusted execution environment processes, the secret from a particular non-trusted execution environment process of the one or more non-trusted execution environment processes, and cryptographically protecting the secret comprises, responsive to the particular trusted execution environment process receiving the secret from the particular non-trusted execution environment process, cryptographically protecting, by the one or more processors, using the one or more trusted execution environment processes, the secret to prevent use of the secret except by processes executed in the trusted execution environment of the one or more processors.

8. The method of claim 1, further comprising, receiving, by the one or more processors, using a particular trusted execution environment process of the one or more trusted execution environment processes, the policy from a particular non-trusted execution environment process of the one or more non-trusted execution environment processes; and
cryptographically protecting the policy comprises, responsive to the particular trusted execution environment process receiving the policy from the particular non-trusted execution environment process, cryptographically protecting, by the one or more processors, using the one or more trusted execution environment processes, the policy such that modifications to the policy are detectable.

9. The method of claim 1, wherein a hardware architecture of the one or more processors isolates processes executed by the one or more processors in the trusted execution environment of the one or more processors from processes operating in an operating system outside the trusted execution environment of the one or more processors.

10. The method of claim 1, further comprising:
based on the policy, invalidating, by the one or more processors, using the one or more trusted execution environment processes, the secret.

11. The method of claim 1, wherein the request is a first request, the non-trusted execution environment processes include an application programming interface process, and the method further comprising:
receiving, by the one or more processors, using the application programming interface process, the first request;
responsive to the first request:
generating, by the one or more processors, using the application programming interface process, a second request; and
responsive to the second request, providing, by the one or more processors, using the one or more trusted execution environment processes, the policy to the application programming interface process.

12. The method of claim 11, further comprising:
responsive to receiving the policy, validating, by the one or more processors, using the application programming interface process, that no unauthorized modifications to the policy have occurred.

13. The method of claim 1, wherein the secret comprises a cryptographic key.

14. The method of claim 13, wherein:
the request is to encrypt data using the cryptographic key or to generate a digital signature for the data using the cryptographic key,
performing the action comprises using, by the one or more processors, using the one or more trusted execution environment processes, the cryptographic key to encrypt the data or to generate the digital signature for the data, and
the method further comprises sending, by a device comprising the one or more processors, the encrypted data or the digital signature to a remote computing device.

15. A computing device comprising one or more microprocessors configured to provide:
a trusted execution environment that executes one or more trusted execution environment processes, wherein the one or more trusted execution environment processes are configured to:
cryptographically protect a secret to prevent use of the secret except by the one or more trusted execution environment processes; and
cryptographically protect a policy such that modifications to the policy are detectable, the policy specifying a plurality of conditions on usage of the secret; and
a general execution environment that executes one or more non-trusted execution environment processes, wherein a hardware architecture of the computing device isolates processes executed in the trusted execution environment from operating in the general execution environment, wherein:
a particular non-trusted execution environment process of the one or more processes is configured to generate a request whose fulfillment involves an action requiring use of the secret,
the one or more non-trusted execution environment processes are configured such that, responsive to the request, the one or more processes determine that a first subset of the plurality of conditions is satisfied,
the one or more trusted execution environment processes are configured such that, responsive to the first subset of the plurality of conditions being satisfied, the one or more trusted execution environment processes determine that a second, different subset of the plurality of conditions is satisfied, and
the one or more trusted execution environment processes are configured such that, responsive to the second subset of the plurality of conditions being satisfied, the one or more trusted execution environment processes use the secret to perform the action.

16. The computing device of claim 15,
the request is a first request and the action is a first action, and
the one or more non-trusted execution environment processes are further configured to:
generate a second request whose fulfillment involves a second action requiring use of the secret; and
responsive to the second request:
determine that the first subset of the plurality of conditions is not satisfied; and
responsive to the first subset of the plurality conditions not being satisfied, refraining from performing the second action.

17. The computing device of claim 15, wherein:
the request is a first request and the action is a first action;
the one or more non-trusted execution environment processes are further configured to:
generate a second request whose fulfillment involves a second action requiring use of the secret; and
responsive to the second request, determine that the first subset of the plurality of conditions is satisfied; and
the one or more trusted execution environment processes are further configured to:
responsive to the first subset of the plurality of conditions being satisfied, determine that the second subset of the plurality of conditions is not satisfied; and
responsive to the second subset of the plurality conditions not being satisfied, refrain from performing the second action.

18. The computing device of claim 15, wherein the secret comprises a cryptographic key, the request is to encrypt data using the cryptographic key or to generate a digital signature for the data using the cryptographic key,
- the one or more trusted execution environment processes are configured to use the cryptographic key to encrypt the data or to generate the digital signature for the data, and
- the computing device is configured to send the encrypted data or the digital signature to a remote computing device.

19. A non-transitory computer-readable data storage medium comprising instructions stored thereon that, when executed by one or more micro-processors, cause the one or more micro-processors to:
- execute, in a trusted execution environment of a particular micro-processor of the one or more micro-processors, one or more trusted execution environment processes, wherein the one or more trusted execution environment processes are configured to:
- cryptographically protect a secret to prevent use of the secret except by the one or more trusted execution environment processes; and
  - cryptographically protect a policy such that modifications to the policy are detectable, the policy specifying a plurality of conditions on usage of the secret; and
- execute, in the one or more micro-processors, one or more trusted execution environment processes, wherein a hardware architecture of the particular micro-processor isolates processes executed by the particular micro-processor in the trusted execution environment from operating outside the trusted execution environment, wherein:
- a particular non-trusted execution environment process of the one or more non-trusted execution environment processes is configured to generate a request whose fulfillment involves an action requiring use of the secret,
- the one or more non-trusted execution environment processes are configured such that, responsive to the request, the one or more processes determine that a first subset of the plurality of conditions is satisfied,
- the one or more trusted execution environment processes are configured such that, responsive to the first subset of the plurality of conditions being satisfied, the one or more trusted execution environment processes determine that a second, different subset of the plurality of conditions is satisfied, and
  - the one or more trusted execution environment processes are configured such that, responsive to the second subset of the plurality of conditions being satisfied, the one or more trusted execution environment processes use the secret to perform the action.

20. The non-transitory computer-readable data storage medium of claim 19, wherein a particular trusted execution environment process of the one or more trusted execution environment processes is configured to receive the secret and the policy from a particular non-trusted execution environment process of the one or more non-trusted execution environment processes.

* * * * *